No. 700,083. Patented May 13, 1902.
J. POLIAKOFF.
PHOTOGRAPHIC SHUTTER CONTROLLING DEVICE.
(Application filed Feb. 27, 1901.)
(No Model.) 3 Sheets—Sheet 3.
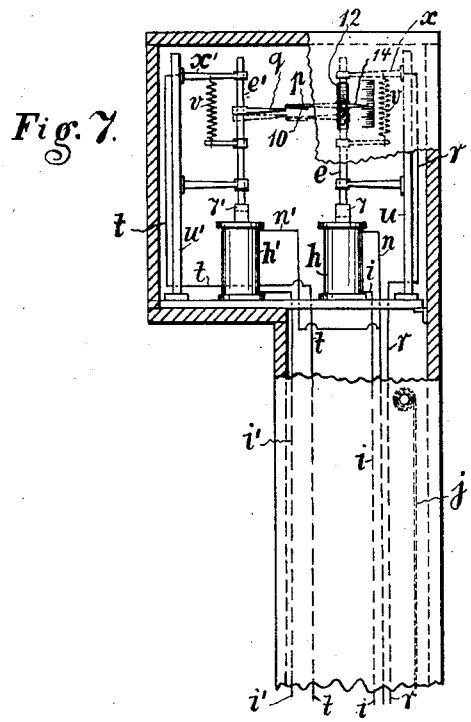
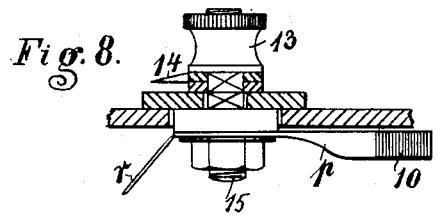
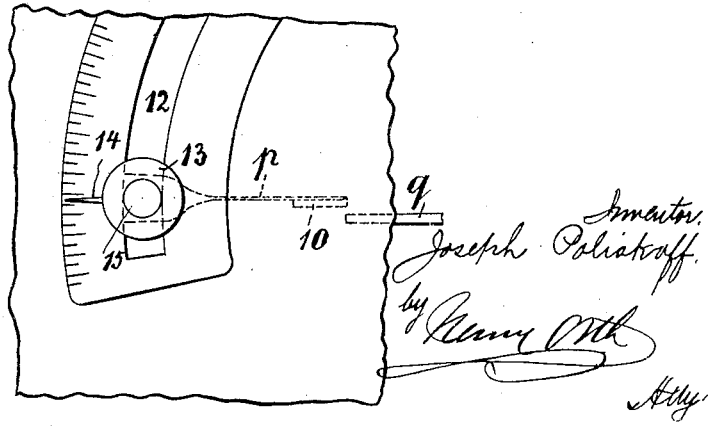

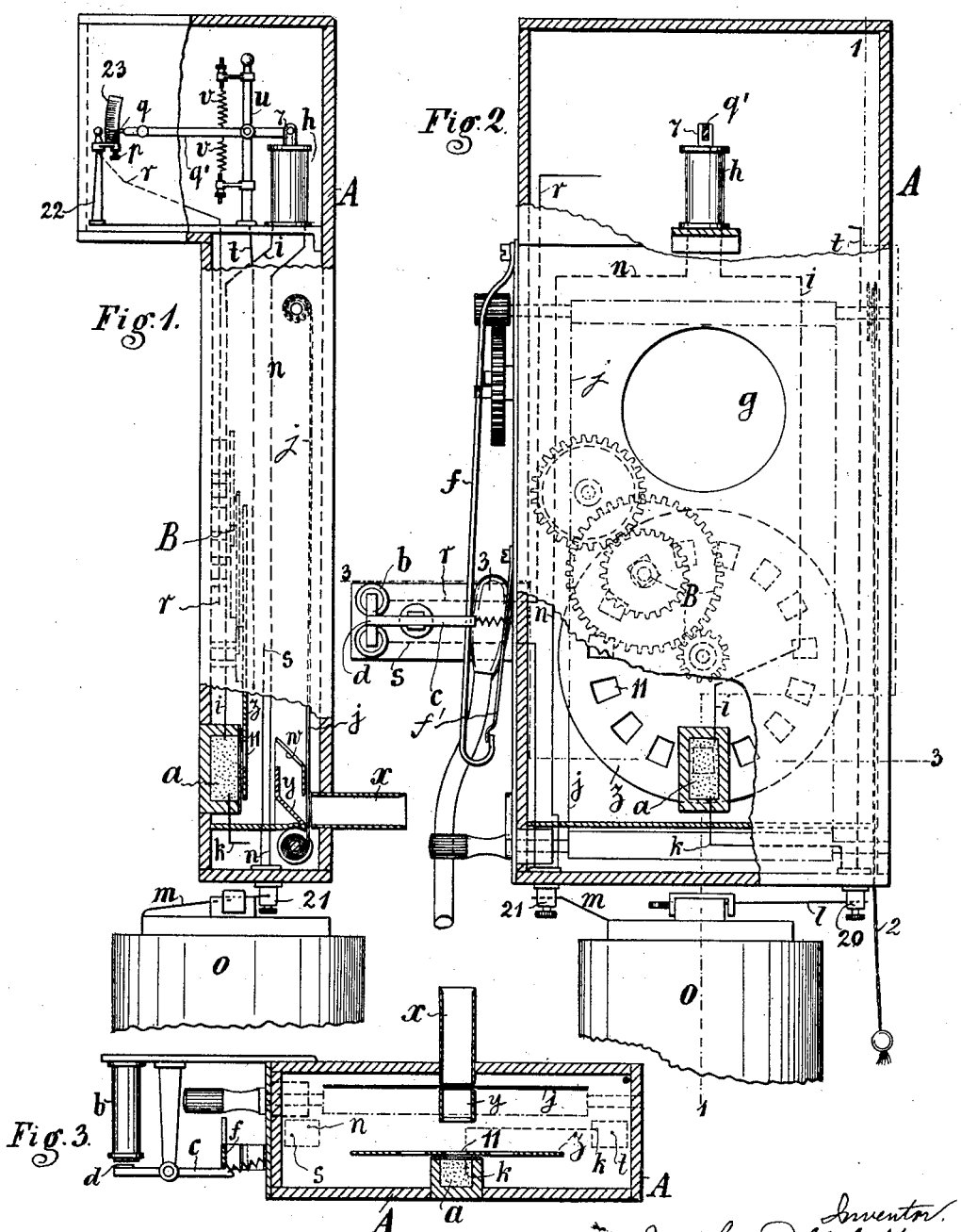

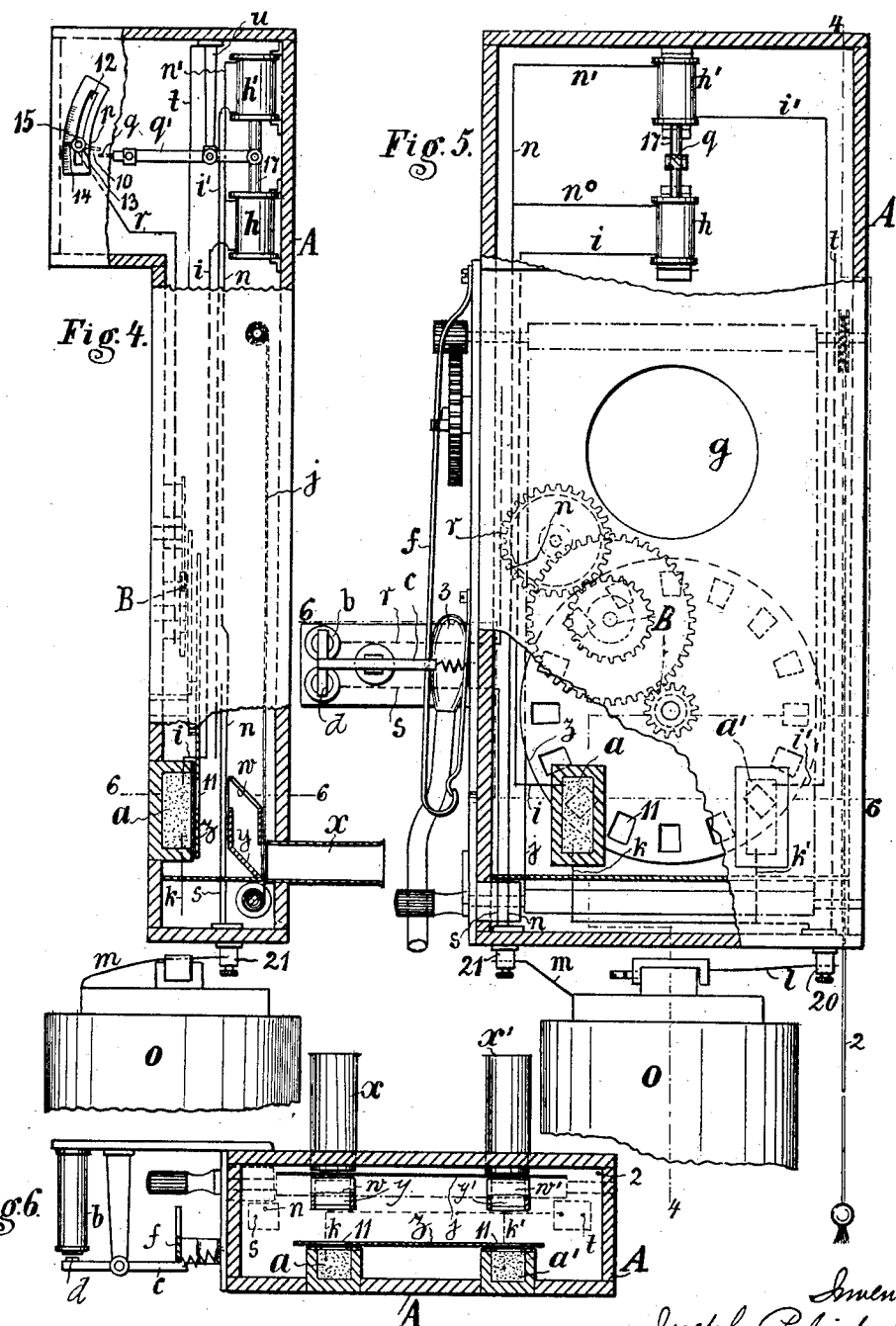

UNITED STATES PATENT OFFICE.

JOSEPH POLIAKOFF, OF CHARLOTTENBURG, GERMANY.

PHOTOGRAPHIC-SHUTTER-CONTROLLING DEVICE.

SPECIFICATION forming part of Letters Patent No. 700,083, dated May 13, 1902.

Original application filed July 18, 1900, Serial No. 24,078. Divided and this application filed February 27, 1901. Serial No. 49,180. (No model.)

*To all whom it may concern:*

Be it known that I, JOSEPH POLIAKOFF, a subject of the Emperor of Russia, residing at Charlottenburg, near Berlin, Germany, have invented certain new and useful Improvements in Photographic-Shutter-Controlling Devices, (being a division of my application, Serial No. 24,078, filed the 18th day of July, 1900;) and I do hereby declare the following to be a full, clear, and exact description of the invention, such as will enable others skilled in the art to which it appertains to make and use the same, reference being had to the accompanying drawings, and to letters and figures of reference marked thereon, which form a part of this specification.

My invention relates to photographic shutters.

The object is to provide an automatic shutter, and more particularly such that makes exposures of various lengths of time, and also to provide electrically-controlled shutters whose electric mechanism is controlled by means of a selenium or other photo-electric cell.

It has also for its object details of construction and arrangements for controlling and varying the time of exposure hereinafter pointed out and particularly claimed.

Referring to the drawings, in which like parts are similarly designated, Figure 1 is a side view, partly in section, of a shutter of the Thornton-Pickard type, together with the electrically-controlling mechanism. Fig. 2 is a front view of the same, parts of the casing being broken away. Fig. 3 is a section on line 3 3 of Fig. 2. Fig. 4 is a view similar to Fig. 1, showing a modification of the circuit-closing device. Fig. 5 is a front view of Fig. 4, parts of the casing being broken away. Fig. 6 is a section on line 6 6 of Fig. 5. Fig. 7 is a further modification of the circuit-closing devices. Fig. 8 is a partial section, and Fig. 9 a front elevation, of an adjustable contact.

Referring to Figs. 1, 2, and 3, A is a casing in which is contained a shutter of the Thornton-Pickard or other suitable type, comprising a curtain $j$, arranged to uncover and cover the lens and at the same time uncover and cover an auxiliary opening or tube, here shown as situated below the lens, to admit light to a photo-electric resistance or cell behind the shutter. The usual releasing-lever $f$ is returned to normal position by the spring $f'$ after the shutter has been released by the bulb. In range of the spring-lever $f'$ is a pivoted detent-lever $c$, provided with a hook at one end arranged to hold the lever $f$ against the stress of its spring $f'$. An electromagnet $b$ is arranged to attract an armature $d$ on the tail of the lever $c$.

Behind the tube $x$, uncovered by the curtain $j$, is a reflector $y$, set at an angle to the axis of the tube $x$, designed to reflect light upon an actinic sheet or reflector $w$, which may be a strip of actinic paper and from which the light is again reflected to the selenium or other photo-electric cell $a$. This cell is included in an electric circuit from a battery O, hung from or located below the camera. This battery has one pole connected by wire $l$ to a binding-post 21 on the casing A. There are two circuits, one, containing the shutter-releasing mechanism, closed by the other, containing the cell $a$. In the circuit through the cell $a$ is a solenoid $h$, whose core 7 is suspended from one end of a lever $q'$. This lever $q'$ is pivoted on a conductive support or post $u$ and is held in normal position by springs $r$ and $v$, of equal tension, on opposite sides of said lever, said springs being adjustable and acting as dampers to reduce the oscillation of the lever $q'$. The other end of lever $q'$ carries a contact that is arranged to close the first-mentioned circuit through an adjustable contact $p$, said adjustable contact comprising a screw adjustable in a suitable support 22. Behind this screw is a scale 23, suitably arranged to indicate times of exposure by adjusting the screw thereto. This contact $p$ is connected by wire $r$ to the magnet $b$. As selenium acts as a conductor to the best advantage when it is subjected to intermittent light, I place between the cell and the reflecting sensitized strip $w$ a rotating disk $z$, having perforations 11 near its periphery designed to produce during the rotation of the disk an intermittent exposure of said cell. This disk is moved in any desired manner, as by means of a suitable clockwork B.

The circuits which are in parallel will be as follows: battery O, wire *l*, binding-post 20, wire *k*, cell *a*, wire *i*, solenoid *h*, wire *n*, binding-post 21, wire *m*, back to battery O.

The parallel circuit operating the releasing-lever *f* is as follows: battery O, wire *l*, binding-post 20, wire *t*, standard *u*, pivoted lever *q'*, adjustable contact *p*, wire *r*, electromagnet *b*, wire *s*, binding-post 21, wire *m*, back to battery O.

The operation will be as follows: The shutter is set in usual manner by pulling the cord 2 and the clockwork set so as to rotate the disk *z*. On squeezing the bulb (not shown) the rubber ball 3 will be distended, thereby moving the releasing-lever *f* against the stress of its return-spring *f'* into the range of the hook on the end of the detent-lever *c*, simultaneously releasing the curtain and setting in motion the disk-operating mechanism. Light will enter the tube *x*, be reflected from the mirror *y* to the sensitized reflector *w*, thence through the perforations 11 in the disk *z*, that are moving across the path of reflected light to the selenium cell *a*, immediately rendering this a conductor. Current will then pass through the circuit to energize the solenoid *h*. Its core 7 will be attracted, and the circuit between *p* and *q* will be broken, the armature *d* released, and the hook end of the detent-lever *c* be brought into engagement with the lever *f*. The light coming into the tube *x* will darken the actinic reflector *w* until it will reflect too little light to render the selenium cell *a* a conductor. This will break the solenoid circuit, deënergize the solenoid, causing the core 7 to be released, and the lever *q'* will swing into normal position to close circuit through *p* to send current to energize the electromagnet *b*, which attracts its armature *d*, thereby releasing the detent-lever *c* and the lever *f* to close the shutter. A similar mechanism is shown in Figs. 4 to 6; but in this case I have shown two selenium cells *a* and *a'* in parallel circuits with two electromagnets *h* and *h'* in the circuits, whose common core is connected to and balanced on the end of the lever *q'*, that contacts with an adjustable contact *p*, slidable in a slot 12 in the side of the casing A. This contact is adjustable by means of a thumb-screw 15 and carries an index-hand 14, slidable over and along an exposure-scale. These circuits being in parallel, each one would be capable of moving the lever *q'* to close the circuit should the other become inoperative from any cause, one of the cells only then being operative.

Instead of having two sensitized reflectors *w*, which may be a strip of actinic paper, I may use only one, the other, *w'*, being of a constant color. This arrangement will cause the two cells to be of unequal conductivity, or rather the conductivity of one will vary unequally to that of the other. Immediately after they are exposed to the action of the light, consequently, the solenoids *h* and *h'* will differ in strength, so that the lever *q* will be caused to break circuit at *p* and assume normal contacting position only when the strength of both solenoids *h* and *h'* will be equal, which will be when the strip *w* has assumed an equal color value with the strip *w'*, thus closing circuit at *p* to send current to the magnet *b* to release the lever *f*, that actuates the shutter.

The circuit through the cell *a'* is as follows: battery O, wire *l* to binding-post 20, wire *k'*, cell *a'*, wire *t'*, solenoid *h'*, wire *n'*, wire *n*, binding-post 21, wire *m*, back to battery, and that through the cell *a* battery O, wire *l*, binding-post 20, wire *k*, cell *a*, wire *i*, solenoid *h*, wire *n'*, wire *n*, binding-post 21, wire *m* back to battery.

The circuit for the shutter-actuating mechanism is as follows: battery O to binding-post 20, wire *t*, standard *u*, lever *q'*, contact *p*, wire *r*, magnet *b*, wire *s*, binding-post 21, wire *m*, back to battery.

Fig. 7 shows a modification of Fig. 5, in which instead of having two solenoids operating a single core and superposed I use two solenoids side by side, each moving a spring-held magnet-core 7 7'. Two standards *u u'*, having conductive arms *z* and *z'*, from which are supported rods *e* and *e'* by springs *v* and *v'*, conduct current to the contacts *p* and *q*. Each of these rods *e* and *e'* carries a contact *p* and *q*, and on the ends of these rods are the solenoid armatures or cores 7 and 7'. Both the solenoids are in parallel, and on the bottom of the contact *p* (shown in the previous figures and also in Fig. 7) I place an insulated piece 10, (more distinctly shown in Figs. 8 and 9,) which may be of celluloid, bone, ivory, or any other substance. The object of this piece 10 is to allow these contacts to touch when moving from the position shown—for instance, in Fig. 7—without closing circuit. When the shutter is opened and exposure begins, the cell *a* is subjected to light by far more energetic than the cell *a'*, and therefore the solenoid *h* is energized more powerful than solenoid *h'*, so as to cause the contact *p* to pass contact *q* the moment the curtain is actuated. Of course circuit should not be closed at this moment, and this is prevented by reason of the piece 10. The darkening of the strip *w* will then gradually allow solenoid *h* to assume the same strength as *h'*, so that the contacts *p* and *q* approach each other and finally arrive in contact position, when the shutter automatically closes. Hereupon the solenoids will be deënergized, and the contacts *q* and *p* will assume the position of rest—as, for instance, shown in Fig. 7.

The apparatus may be adjusted for photographic plates of different sensitiveness by choosing different reflectors *w'* of constant color of corresponding darkness. For final accurate adjustment the contact *p* may be moved up or down on its rod *e*, showing the degree of such adjustment by means of the position of the index-hand 14 on the exposure-scale.

Having now described my invention, what I claim as new, and desire to secure by Letters Patent, is—

1. The combination with a photographic shutter adapted to be arrested in open position, and mechanism for actuating said shutter; of an electric circuit, devices therein electrically actuated, a photo-electric cell, means for rendering the cell conductive in decreasing intensity during the time of exposure, thereby moving said devices to cause the shutter-actuating mechanism to close the shutter, substantially as and for the purpose set forth.

2. The combination with a photographic shutter and its actuating mechanism, of an electric circuit, devices therein electrically actuated, a photo-electric cell in said circuit and means for rendering said cell conductive in decreasing intensity, thereby moving said device to cause the operation of said shutter-actuating mechanism, substantially as set forth.

3. The combination with a photographic shutter, of electrically-controlled detent mechanism holding said shutter open, an electric circuit containing a photo-electric cell organized to close circuit to operate devices to release the detent mechanism, thereby closing the shutter, substantially as set forth.

4. The combination with a photographic shutter, of circuit-closing devices, a photo-electric cell electrically connected therewith, an auxiliary circuit, electrically-controlled shutter-detent mechanism therein, said circuit-closing devices arranged to send current to actuate the shutter-detent mechanism, substantially as set forth.

5. The combination with a photographic shutter and its actuating mechanism, of a circuit and means for electrically releasing the shutter-actuating mechanism, a parallel circuit, a photo-electric resistance and circuit-closing devices therein, and means for admitting light to said cell, thereby actuating the circuit-closing devices to send current to release the shutter-actuating mechanism, substantially as set forth.

6. In a combination with a source of electricity, a circuit, a solenoid and a selenium cell in series in said circuit, a second circuit, a circuit-closing switch and electrically-operated means to cause the actuation of a photographic shutter in said second circuit, substantially as set forth.

7. In combination, a photographic shutter, a source of electricity, a circuit containing a switch and electrically-operated means to cause the actuation of the photographic shutter, a second circuit divided into two branches, each branch containing a solenoid and a photo-electric resistance, said solenoid arranged to operate said switch, substantially as and for the purpose set forth.

8. In combination, a photographic shutter, a source of electricity, a circuit, a switch and electrically-operated means in said circuit to cause the actuation of the photographic shutter, a second circuit divided into two branches, a selenium cell, and a solenoid in series in each branch, means for temporarily causing one cell to be of a different resistance from the other, a core common to both solenoids and arranged to operate said switch, substantially as set forth.

9. In combination, a photographic shutter, a source of electricity, a circuit, a switch and electrically-operated means in the circuit to cause the actuation of said shutter, a second circuit divided into two branches, each containing a selenium cell and a solenoid, movable core common to said solenoids, the latter arranged for differential action, said cores organized to operate the switch and means to cause a difference of resistance in said cells, substantially as set forth.

10. The combination with a pneumatic photographic shutter, of a source of electricity, a circuit, a switch and shutter-detent mechanism therein, a second circuit divided into two branch circuits, each containing a selenium cell and a solenoid, means for causing a differential action of said solenoid by varying the conductivity of one of the cells relatively to the other and cores for said solenoid arranged to close the first-mentioned circuit, substantially as set forth.

11. The combination with a photographic shutter, of a source of electricity, a circuit, electrically-operated shutter-releasing mechanism therein, a second circuit, a photo-electric resistance and a circuit-closer therein, and devices for intermittently admitting light to said cell, thereby actuating the circuit-closer to release the shutter, substantially as set forth.

12. The combination with a photographic shutter, of a source of electricity, a circuit, electrically-operated shutter-detent mechanism therein, a second circuit, a photo-electric cell and circuit-closer therein, means for intermittently admitting light to said cell and auxiliary means for decreasing the intensity of said light, thereby actuating the circuit-closer to send current through the first-mentioned circuit and release the shutter, substantially as set forth.

13. The combination with a photographic shutter, of a source of electricity, a circuit containing electrically-operated shutter-detent mechanism, two branch circuits each containing a selenium cell and both of said circuits arranged to differentially operate a circuit-closer, mechanism for intermittently admitting light to each of said cells and a device for gradually decreasing the action of light on one of said cells, thereby actuating the circuit-closer to send current through the first-mentioned circuit to release the shutter, substantially as set forth.

14. The combination with a photographic shutter, of a source of electricity, a circuit containing electrically-operated shutter-detent mechanism, two circuits in parallel with the first circuit, each containing a selenium cell, a differentially-operated circuit-closer in said parallel circuit, a perforated diaphragm moved past said cells, means for admitting light of decreasing intensity to one and of constant intensity to the other of said cells and through the opening in said diaphragm, substantially as set forth.

15. The combination with a photographic shutter, of a source of electricity, a circuit, electrically-operated detent mechanism and a pair of contacts therein, two circuits in parallel with the first circuit, a selenium cell and a solenoid in each of the two parallel circuits, said contacts arranged to be closed by said solenoid, a rotating perforated diaphragm moved past said cells, means for admitting light of decreasing intensity to one and of constant intensity to the other of said cells through the opening in the diaphragm, substantially as set forth.

16. The combination with a photographic shutter, of an electric circuit, electrically-operated shutter-detent mechanism and a pair of contacts therein, a second circuit, a photo-electric resistance and a solenoid arranged to operate the mechanism to close said contacts in said circuit, a perforated diaphragm moved past and its perforations arranged to register with said cell, means for reflecting light from an actinic medium through the perforation to said cell, substantially as set forth.

17. The combination with a photographic shutter, of an electric circuit, electrically-operated shutter-detent mechanism and a pair of contacts therein, a second circuit, a selenium resistance and a solenoid in the latter circuit arranged to open and close said contacts, a perforated diaphragm mechanically revolved past and whose perforations register with said cell, means for reflecting light to an actinic body and from the latter through the perforations to said cell, substantially as set forth.

18. The combination with a photographic shutter, of an electric circuit, electrically-operated shutter-detent mechanism and a pair of contacts therein, means for spacing said contacts to vary the time of exposure, two branch circuits in parallel, a solenoid and photo-electric cell in each of the branch circuits, a perforated rotating disk, the perforations therein rotatable past said cell, a clockwork for moving said disk and means for reflecting light from an invariable reflector near each cell to an actinic reflector at one cell and a reflector of constant color at the other and from said last reflector through the rotating diaphragm to the respective cells, substantially as set forth.

19. The combination with a photographic shutter, of an electric circuit, a selenium cell acting as electric conductor when subjected to light and as resistance when withdrawn from light, a sensitive body darkening by the action of light and placed between the selenium cell and the light, an electrically-operated shutter-detent mechanism in such connection with the selenium cell that on the change of the electric circuit the detent is released and the shutter closed.

20. The combination with a photographic shutter and its actuating mechanism, of electrically-operated means for controlling the operation of the shutter and a photo-electric resistance operatively combined with said means, whereby exposure is made in accordance with the intensity of the light, substantially as set forth.

21. The combination with a photographic shutter and its actuating mechanism, of electrically-operated means for controlling the operation of said shutter and a pair of photo-electric resistances, the combined action of which is differential, operatively combined with said means, whereby exposure may be regulated in accordance with the intensity of light, substantially as set forth.

In testimony that I claim the foregoing as my invention I have signed my name in presence of two subscribing witnesses.

JOSEPH POLIAKOFF.

Witnesses:
JOHANNES HEIN,
WOLDEMAR HAUPT.